April 20, 1937.   R. V. MORSE   2,077,708
AIRPLANE
Filed Aug. 4, 1934   2 Sheets-Sheet 2
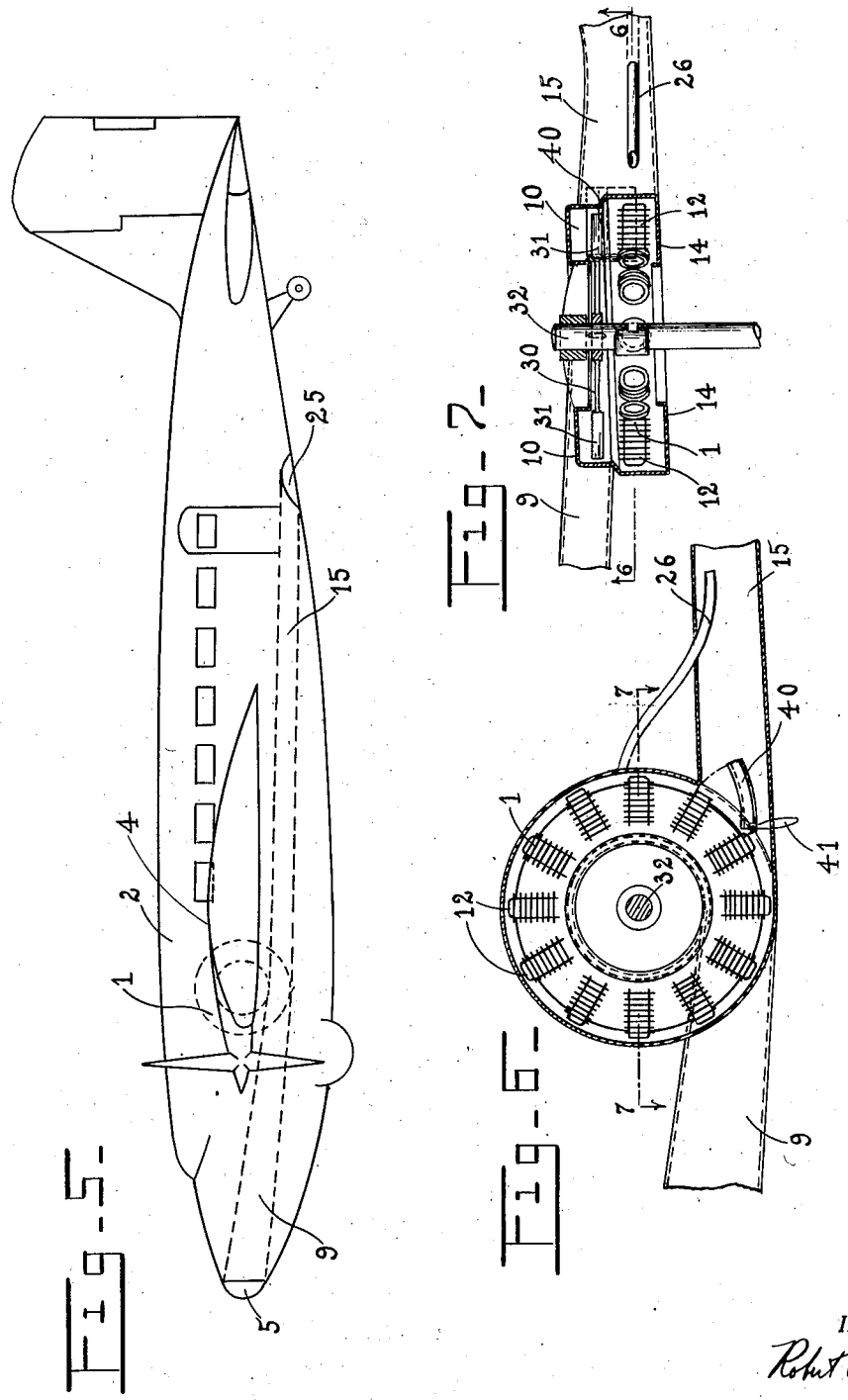
INVENTOR.
Robert V. Morse Patented Apr. 20, 1937

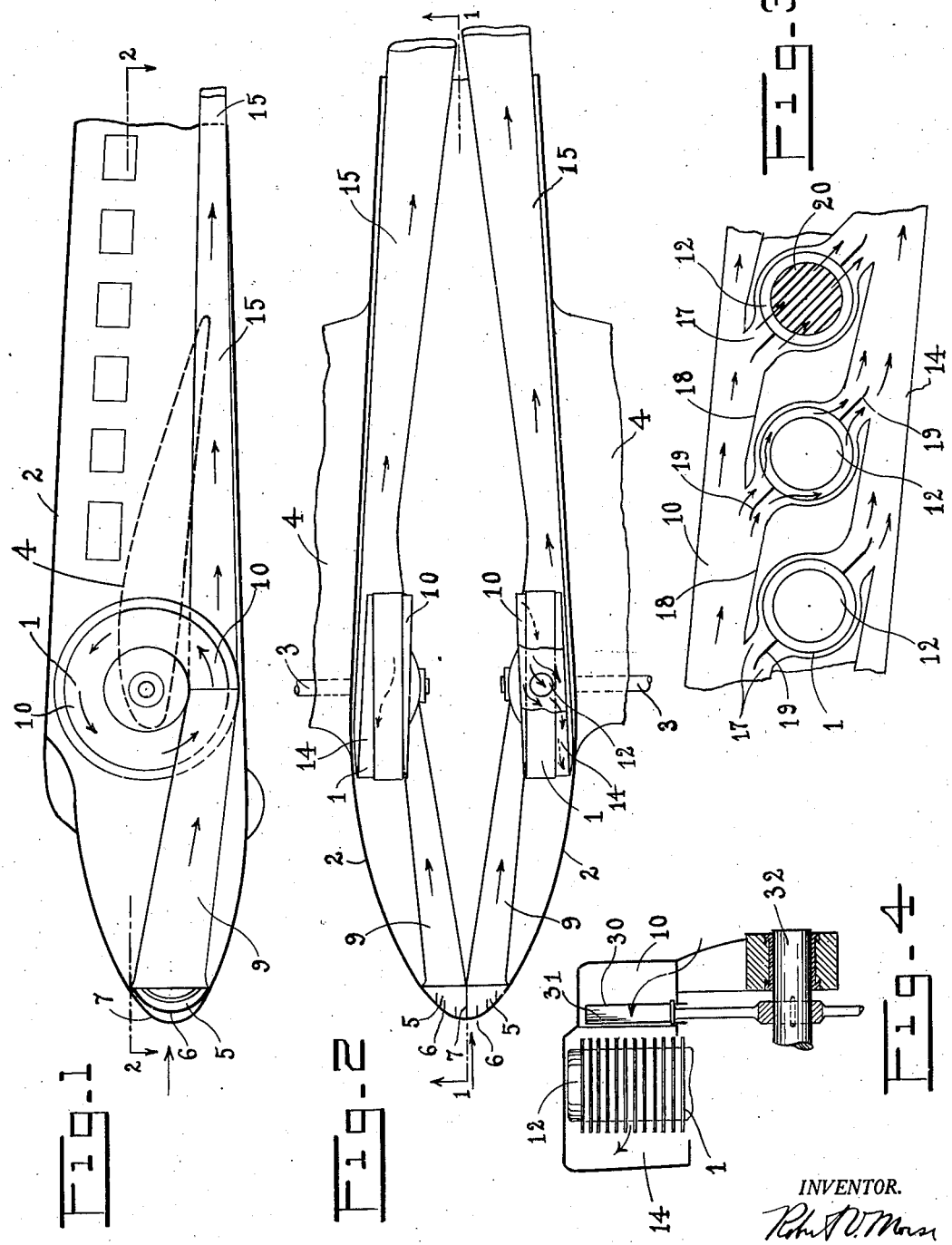

2,077,708

UNITED STATES PATENT OFFICE 2,077,708

AIRPLANE

Robert V. Morse, New York, N. Y.

Application August 4, 1934, Serial No. 738,438

12 Claims. (Cl. 244—55)

This invention relates to airplanes of the type in which radial motors are placed edgewise to the direction of flight and located within the body on the sides thereof in order to give a clean, streamline body and wing such as shown, for example, in my Patent No. 1,702,306, issued February 19, 1929. Such enclosed motors may be cooled in various ways, and the present invention is directed to an attempt to attain the highest degree of aero-dynamic efficiency for the airplane as a whole, by so introducing and discharging the cooling air as least to impede its progress. Another object is to pass the cooling air through the system and around the cylinders with as few and as gentle turns or obstructions as possible, in order to obtain a high rate of flow and reduce resistance. A further object is to discharge the heated or expanded air from the airplane in such a manner as to minimize drag and assist the airplane in moving forward.

Referring now to the drawings,

Fig. 1 is a vertical cross-section along the center line of the airplane, as indicated by the line 1—1 of Fig. 2;

Fig. 2 is a horizontal cross-section on the line 2—2 of Fig. 1, as though the upper half of the fuselage were lifted off, showing the plan view of the motors and cooling ducts not in section except for a portion of one of the motor-cooling jackets, which is broken away to show the flow of air around a cylinder;

Fig. 3 is diagrammatic plan view in development, showing in greater detail the path of air flow around the sides and over the top of the cylinders, as it is transferred from one side to the other of the whirl chambers;

Fig. 4 is an elevation, partly in section, showing the auxiliary cooling-fan, which is chiefly used when the airplane is standing on the ground, or climbing steeply with full throttle but not full speed;

Fig. 5 is a side elevation of an airplane showing in broken lines the general course of the air cooling ducts and the discharge orifices in the rear;

Fig. 6 is a vertical cross-section showing motor jackets, cooling ducts, and exhaust jet discharge into the air exit duct, together with emergency by-pass gate;

Fig. 7 is a horizontal cross-section on the line 7—7 of Fig. 6.

Similar reference numerals refer to similar parts throughout the various views.

In an airplane of the type referred to, radial motors 1 are used and are placed edgewise, relative to the direction of flight, within the body 2 of the airplane. The motors 1, 1 are preferably spread on the opposite side walls of the body 2 so as to be readily accessible and leave a passageway in between. Each motor 1 drives a short transverse shaft 3 located inside the airplane wing 4, and these shafts, through suitable gearing, drive the propellers on the wings as shown in the patent referred to. That type of airplane, therefore, has a clean body and clean wing, without any motors exposed to the drag of the air.

In order that the advantages of the type of airplane described may be retained to the highest degree with air-cooled motors, it is important to introduce and discharge the cooling air that goes to the enclosed motors as efficiently as possible, and to avoid sharp bends or short radii of curvature in guiding the air.

This invention seeks to guide the air with as gentle curves and as little deflection as possible. Also, certain blunt areas of the airplane offer useless resistance to passage through the air, and by letting the air flow through at these points as freely as possible, the impact or resistance is reduced. Furthermore, if the air thus passed through is heated, expanded and discharged rearwardly through a diverging conduit, a certain propulsive component of the rocket type is added.

In general, the invention is directed toward obtaining these results in a greater or less degree, to the end that the total drag may be as little as is compatible with adequate cooling of the motors when enclosed and arranged as described.

Referring again to the drawings, the cooling air enters through openings 5, 5 in the forward portion or nose of the fuselage; the entrance may be protected by grilles or vanes 6 to guide the air flow and prevent the entry of any large object. The entry conduits are separated by the wall 7 to insure that each will get its share of air, and the openings 5, 5 may be further separated if desired, in which case they would lie farther back on the nose of the airplane.

Taking up now the cooling of one of the radial motors 1 (the other one being similar), the opening 5 leads to the intake conduit 9 which extends backward to the ingoing whirl-chamber 10. This ingoing whirl-chamber 10 constitutes approximately half of the air jacket which surrounds the radial motor 1, and loops around in a somewhat helical form. The term whirl-chamber is used because of this looping or helical form, which whirls the air around once in its passage through a bank of cylinders. The incoming air loops around as shown by the arrows in Fig. 1 and Fig.

2 and is distributed equally to all the cylinders 12 of the radial motor 1, passing around or over them, as indicated in the lower part of Fig. 2, and more in detail in Fig. 3, after which the air enters the outgoing whirl-chamber 14. This chamber 14 constitutes the other half of the air jacket and is also of somewhat helical form, picking up the air from the cylinders and discharging it to the exhaust duct 15.

Referring now to Fig. 3, and taking up the flow of air around the cylinders 12 more in detail, it will be noted that the ingoing whirl-chamber or jacket 10 tapers in toward the cylinders as it progresses, in accord with the diminishing volume available for the remaining cylinders; and, conversely, the outgoing whirl-chamber or jacket 14 tapers the other way to carry away the increasing volume of air as it picks up more cylinders. In order to transfer air around the cylinders 12 with the least disturbance possible, the air is picked up in a diagonal manner by a streamline orifice 17 formed by baffles 18 which lie between the cylinders. Also there is preferably provided a fin or vane 19, which divides the air so that it will flow equally around the two sides of the cylinder 12, as shown particularly in the middle cylinder in Fig. 3.

It will be noted that as the air flows around the whirl-chamber 10 it follows a gentle curve of as long a radius as is possible within the confines of the airplane, and that the path around the cylinders (Fig. 3) is as short as possible, with no more deviation than is necessary to pass through the fins.

On the head of the cylinder (see the right-hand cylinder in Fig. 3), the air passes directly across through straight parallel cooling fins 20, as indicated by the arrows. In order that the fins 20 shall introduce minimum resistance, they are preferably run diagonally across the cylinder head instead of parallel to the axis of the motor, as in ordinary practice; but otherwise, no considerable change in the direction of the fins is required.

In passing through and around the cooling fins the air is heated, and a considerable portion of the heat energy available in the fuel is normally dissipated. While it is difficult to utilize this energy very efficiently, nevertheless it is desirable to do so as far as possible. Accordingly, the outgoing whirl-chamber 14 leads into a discharge conduit or nozzle 15, which is tapered outwardly or expanded as it progresses, so that the heated air will be expelled rearwardly, as from a nozzle, and thus aid the forward movement of the airplane. By so discharging the air the stream lines around the airplane are not seriously disturbed. The air may finally pass from the body through openings or louvres 25 similar to those through which it entered, or from any suitable rearwardly-directed orifices. The rearwardly-directed jet or flow may be supplemented or accelerated, if desired, by also discharging the exhaust 26 from the engine in the conduit 15, as shown in Fig. 6 and Fig. 7, so that the hot exhaust gases from the engine may add their velocity and heat energy to that of the air.

In airplanes travelling at high speed, the air blast due to the motion of the plane is generally sufficient to furnish ample air for cooling the cylinders; but when idling on the ground, or climbing steeply with full throttle and comparatively low speed, the natural blast may be insufficient. This requires the use of an engine-driven fan or blower, shown diagrammatically in Fig. 4. This fan or blower 30 may be of any suitable type, propeller, centrifugal or any other well-known form; the form used for illustration in Fig. 4 having its blades 31 driven from the engine-shaft 32. Where a supercharger is used, gas turbine or gear-driven blades may be available.

The fan or blower 30 takes the air from the ingoing whirl-chamber 10 and blows it through and over the cooling fins to the outgoing whirl-chamber 14. The fan 30 may absorb considerable power, so it is desirable that it go out of action when it is not needed. In order that this may take place automatically without attention on the part of the aviator, the blades 31 may be placed at such an angle that when the incoming air has the velocity corresponding to full speed of the airplane through the air, the blades will have little or no propulsive effect. This is done by laying the blade on the resultant of the incoming air velocity component and the blade rotation component, as will be apparent to the designers of blowers and fans. The blades will then, in effect, merely float or idle when the airplane is travelling at full speed, or, at least, only absorb a portion of the power that they require when picking up still air. Thus, when help from the fan is needed, it will automatically go into action, its blade angle then being such relative to the slower incoming air as to increase its velocity; yet, as the incoming air comes faster, the load on the fan will be less and less, until it finally may be practically idling in the air flow, though rotating at full speed.

In some special cases, as for example when flying through rain or snow, or when an excess of cooling air is available, it may be desirable to by-pass a portion of the air from the incoming conduit 9 to the outgoing conduit 15, without passing it around the cylinders. For this purpose a gate 40 is provided, which may be opened by any suitable lever such as 41, to allow a direct connection between the two conduits. This gate 40 is preferably located near the periphery and near the beginning of the whirl chambers, so that the heavier rain or snow particles will be thrown out centrifugally and be passed directly into the discharge conduit 15.

While I have in the foregoing described certain specific examples, it will be understood that they are merely for purposes of illustration, to make clear the principles of the invention, which is not limited to the particular form shown, and is susceptible to various modifications and adaptations in different installations, as will be apparent to those skilled in the art, without departing from the scope of the invention as stated in the following claims.

I claim:

1. In a cooling system for airplanes, the combination of a fuselage, radial air-cooled motors located within the fuselage with their axes substantially transverse to the line of flight, air jackets for the motors having whirl chambers formed to loop the cooling air back around a circuit of the motors in a substantially helical manner, intake air conduits extending from the lower portion of one side of the whirl chambers toward the nose of the fuselage, outgoing air conduits extending from the lower portion of the other side of the whirl chambers toward the rear of the fuselage, and means to assist the flow of air through the cooling system.

2. In a cooling system for airplanes, the combination of a fuselage, radial air-cooled motors located within the fuselage with their axes substantially transverse to the line of flight, conduits for the intake of cooling air extending from the forward portion of the fuselage to the lower side of the motors, air jackets connecting with said intake conduits and formed to carry the air through a complete loop around said transverse axes in a substantially helical manner in cooling the motors, and discharge conduits for the cooling air connecting with said jackets and extending toward the rear of the fuselage, whereby the cooling air is passed through the system with a minimum of sharp bends.

3. In a cooling system for airplanes, the combination of a fuselage, radial air-cooled motors located within the fuselage with their axes substantially transverse to the line of flight, conduits for the intake of cooling air extending from the forward portion of the fuselage to the lower side of the motors, air jackets connecting with said intake conduits and formed to carry the air through a complete loop around said transverse axes in a substantially helical manner in cooling the motors, and discharge conduits for the cooling air connecting with said jackets and extending toward the rear of the fuselage, and means to assist the flow of air through the cooling system.

4. In a cooling system for airplanes, the combination of a fuselage, air-cooled motors having cylinders radially arranged located within the fuselage with the motor axes substantially transverse to the line of flight, air jackets formed to pass cooling air around or over the cylinder walls in a diagonal direction relative to the direction of flight and passing the air in general in a loop around the motor axes, intake air conduits extending from the forward portion of the fuselage to the air jackets, and discharge conduits for the cooling air after it has been heated by the cylinders extending toward the rear of the fuselage, so as to discharge the heated air rearwardly.

5. In a cooling system for airplanes, the combination of a fuselage, air-cooled motors having cylinders radially arranged located within the fuselage with the motor axes substantially transverse to the line of flight, air jackets formed to pass cooling air around or over the cylinder walls in a diagonal direction relative to the direction of flight and passing the air in general in a loop around the motor axes, intake air conduits extending from the forward portion of the fuselage to the air jackets, and discharge conduits for the cooling air after it has been heated by the cylinders extending toward the rear of the fuselage, so as to discharge the heated air rearwardly, and means to assist the flow of air through the cooling system.

6. In a cooling system for airplanes, a multicylinder air-cooled motor of the radial type placed substantially edgewise to the direction of flight of the airplane and enclosed within the airplane, an air intake conduit leading from the nose of the airplane to the motor, an air jacket formed to loop the air around the axis of the motor and pass the air substantially helically from one side of the motor cylinders to the other, said air jacket being connected to the intake conduit, and a discharge conduit also connected to said jacket and arranged to discharge the heated air rearwardly from the airplane.

7. In a cooling system for airplanes, a multicylinder air-cooled motor of the radial type placed substantially edgewise to the direction of flight of the airplane and enclosed within the airplane, an air intake conduit leading from the nose of the airplane to the motor, an air jacket formed to loop the air around the axis of the motor and pass the air substantially helically from one side of the motor cylinders to the other, said air jacket being connected to the intake conduit, and a discharge conduit also connected to said jacket and arranged to discharge the heated air rearwardly from the airplane and means to assist the flow of air through the cooling system.

8. In a cooling system for airplanes, a multicylinder air-cooled motor of the radial type placed substantially edgewise to the direction of flight of the airplane and enclosed within the airplane, an air intake conduit leading from the nose of the airplane to the motor, an air jacket formed to loop the air around the axis of the motor and pass the air substantially helically from one side of the motor cylinders to the other, said air jacket being connected to the intake conduit, and a discharge conduit also connected to said jacket and arranged to discharge the heated air rearwardly from the airplane and mechanical means to assist the flow of air through the cooling system.

9. In a cooling system for airplanes, a multicylinder air-cooled motor of the radial type placed substantially edgewise to the direction of flight of the airplane and enclosed within the airplane, an air intake conduit leading from the nose of the airplane to the motor, an air jacket formed to loop the air around the axis of the motor and pass the air substantially helically from one side of the motor cylinders to the other, said air jacket being connected to the intake conduit, and a discharge conduit also connected to said jacket and arranged to discharge the heated air rearwardly from the airplane and means to assist the flow of air through the cooling system comprising mechanical impeller means, said impellers being set at such an angle to the direction of air flow at high speed as to deliver very little effect at high speed, but accelerate the air flow when at lower speeds.

10. In a cooling system for airplanes, a multicylinder air-cooled motor of the radial type placed substantially edgewise to the direction of flight of the airplane and enclosed within the airplane, an air intake conduit leading from the nose of the airplane to the motor, an air jacket formed to loop the air around the axis of the motor and pass the air substantially helically from one side of the motor cylinders to the other, said air jacket being connected to the intake conduit, and a discharge conduit also connected to said jacket and arranged to discharge the heated air rearwardly from the airplane and means to assist the flow of air through the cooling system comprising mechanical impeller means together with motor exhaust jet means in the discharge conduit.

11. In a cooling system for airplanes, the combination of a fuselage, radial motors within the fuselage placed substantially edgewise to the direction of flight, intake conduits for leading cooling air from the forward portion of the fuselage to the lower portion of the motors, air jackets connected to the intake conduit and formed to carry the cooling air around through the motors, discharge conduits connected to the air jackets near the lower portion of the motors, said last mentioned conduits extending toward the back of the fuselage so as to discharge the heated air in a rearwardly direction.

12. In a cooling system for airplanes, the combination of a fuselage, radial motors within the fuselage placed substantially edgewise to the direction of flight, intake conduits for leading cooling air from the forward portion of the fuselage to the lower portion of the motors, air jackets connected to the intake conduit and formed to carry the cooling air around through the motors, discharge conduits connected to the air jackets near the lower portion of the motors, said last mentioned conduits extending toward the back of the fuselage so as to discharge the heated air in a rearward direction, a by-pass between the intake and discharge conduits, and means for opening and closing said bypass.

ROBERT V. MORSE.